(12) United States Patent  (10) Patent No.: US 8,161,059 B2
Guo et al.  (45) Date of Patent: Apr. 17, 2012

(54) METHOD AND APPARATUS FOR COLLECTING ENTITY ALIASES

(75) Inventors: Zhili Guo, Beijing (CN); Xiao Xun Zhang, Beijing (CN); HongLei Guo, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 12/353,530

(22) Filed: Jan. 14, 2009

(65) Prior Publication Data

US 2009/0192996 A1  Jul. 30, 2009

(30) Foreign Application Priority Data

Jan. 29, 2008  (CN) .......................... 2008 1 0004920

(51) Int. Cl.
*G06F 17/30* (2006.01)
(52) U.S. Cl. .................. 707/758; 707/803; 707/999.006
(58) Field of Classification Search .................. 707/737, 707/803, 959, 962, 999.006, 999.101, 758
See application file for complete search history.

(56) References Cited

U.S. PATENT DOCUMENTS

| | | | | |
|---|---|---|---|---|
| 5,664,109 A | * | 9/1997 | Johnson et al. | 707/999.002 |
| 6,957,230 B2 | * | 10/2005 | Cameron et al. | 707/803 |
| 7,865,513 B2 | * | 1/2011 | Welch et al. | 707/758 |
| 2006/0224565 A1 | | 10/2006 | Ashutosh et al. | |
| 2007/0005654 A1 | | 1/2007 | Schachar et al. | |
| 2007/0067297 A1 | * | 3/2007 | Kublickis | 707/9 |
| 2007/0124208 A1 | | 5/2007 | Schachter et al. | |
| 2008/0281816 A1 | * | 11/2008 | Kim | 707/6 |

FOREIGN PATENT DOCUMENTS

WO  WO/2007/085528  8/2007

* cited by examiner

*Primary Examiner* — Marc Filipczyk
(74) *Attorney, Agent, or Firm* — Jeffrey N. Giunta; Fleit Gibbons Gutman Bongini & Bianco PL

(57) ABSTRACT

A system and method for collecting entity aliases include a web object collection component that obtains, from a web search engine, at least one Web object associated with a user' input entity. The system and method also include a social tag collection component that obtains a respective set of social tags for each of the Web objects from a social tag website and defines candidate aliases for the user's input entity based upon the respective set of social tags. An aliases refinement component refines the candidate aliases to obtain a collection of aliases of the user's input entity.

3 Claims, 6 Drawing Sheets

METHOD AND APPARATUS FOR COLLECTING ENTITY ALIASES

CROSS-REFERENCE TO RELATED APPLICATIONS

This application is based upon and claims priority from prior Chinese Patent Application No. 200810004920.5, filed on Jan. 29, 2008 the disclosure of which is hereby incorporated herein by reference in its entirety.

FIELD OF THE INVENTION

The present invention relates to the field of information processing. More specifically, the present invention relates to collecting entity aliases from various sources.

BACKGROUND OF THE INVENTION

The detection and identification of entity aliases are often needed in the fields of security, business analysis and scientific research. The term "entity", as used herein, refers to specific entities, objects or events for which information is stored, for example, a person's name, a place's name, an organization's name, a product's name, etc. An entity often has several "aliases," which refer to additional assumed names of the entity, for example, the legacy names, the abbreviations, or the commonly misused names of the entity. For example, the organizational entity "Beijing Scientific and Technology University" has aliases including "Beijing College of Iron and Steel Technology" (legacy name), "Bei Ke Da" (abbreviation), "Steel College" (abbreviation of legacy name), "Capital Scientific and Technology University" (misused name), etc. In an ideal entity dataset, it is desirable that all of these aliases are identified and merged into one group, so that such an entity dataset can better serve various applications, such as building a data warehouse, performing client relationship management (CRM) and fraud detection. The detection and identification of entity aliases are becoming increasingly important.

The existing solutions to the entity alias problem focus on the discrimination of the identity of entities, that is, to discriminate whether two or more entities are identical from various available clues. These solutions can be divided into two categories based upon whether they use a reference dataset. In the first category, all the input entities are matched to the existing reference entities, and those entities matching with a same reference entity are regarded as aliases. In the second category, the input entities are directly matched to each other. In either solution, the core matching method relies on computing the morphologic, orthographic, phonetic, or semantic similarities of the tokens associated with the entities. For example, the phonetic-based Soundex algorithm encodes all English words by removing vowels and representing the consonants with six phonetic classifications of human speech sounds (bilabial, labiodental, dental, alveolar, velar, and glottal). The "edit distance" algorithm assumes that the differences between two strings can be measured by three kinds of writing alternations (insertion, deletion, substitution). The "behavior-based" algorithm asserts that two entities are connected if they share similar semantic links in a dataset (e.g., if two Email IDs have the same patterns of inbound and outbound emails, then they are most probably owned by a same entity).

The above two existing solutions to the entity alias problem discriminate a number of entities (the "input entities") after having obtained these entities through certain ways, but the solutions do not concern how to get these input entities. Therefore, these solutions cannot solve the problem of obtaining a collection of all the possible aliases for a specific entity.

On the other hand, with the flouring Web 2.0 technology, social tags for Web objects are easily available from social tag websites. In a network-socialized environment, authors and readers are allowed to select their preferred "tags" for a Web object (e.g., Web pages, images, or video segments), i.e., keywords or terms associated with that Web object, and share with others. The social tags, as metadata conferred by the public to Web objects, make possible the social sharing of the network information. For example, when a reader is interested in a Web object, he can get a list of tags added by others to the Web object from the social tag websites, so that the reader may quickly determine the property and usage of the object.

However, social tags, as a tool for enabling the social sharing of network information, has not yet been utilized in collecting entity aliases.

Accordingly, what is needed is a method and system to enhance the above described characteristics of the prior art to provide for improved collection of entity aliases.

SUMMARY OF INVENTION

The object of the present invention is to solve the above problem in the prior art and to provide a method, apparatus and computer program product for collecting entity aliases automatically and quickly.

According to the first aspect of the present invention, there is provided a method for collecting entity aliases that includes obtaining, from a web search engine, at least one Web object associated with a user' input entity. The method also includes obtaining, from a social tag website, a respective set of social tags for each of the Web objects and defining, based upon the respective set of social tags, candidate aliases for the user's input entity. The method additionally includes refining the candidate aliases to obtain a collection of aliases of the user's input entity According to the second aspect of the present invention, there is provided an apparatus for collecting entity aliases includes a web object collection component that obtains, from a web search engine, at least one Web object associated with a user' input entity. The apparatus also includes a social tag collection component that obtains a respective set of social tags for each of the Web objects from a social tag website and defines candidate aliases for the user's input entity based upon the respective set of social tags. The Apparatus further includes an aliases refinement component refines the candidate aliases to obtain a collection of aliases of the user's input entity.

According to the present invention, it is possible to automatically and quickly collect the aliases of almost all the real world entities by obtaining a large number of associated Web objects and their social tags. In addition, social tags reflect the public's cognition of the Web objects associated with the entity. Therefore, the alias collecting based on the social tags have a social nature. As compared with other alias collecting methods which are based on the collector's subjective cognition, the results of the present invention are more comprehensive and more time-effective. Based on the collection of entity aliases obtained by the present invention, the alias resolution can be directly performed by verifying whether designated entities appear in the same one collection.

BRIEF DESCRIPTION OF THE DRAWINGS

From the detailed description of embodiments of the present invention in conjunction with the accompanying drawings, the above mentioned and other objects, features and advantages of the present invention will become more apparent. In the drawings, the same or similar reference numbers are used to indicate the same or similar elements.

DETAILED DESCRIPTION OF THE PREFERRED EMBODIMENTS

Figure 1:
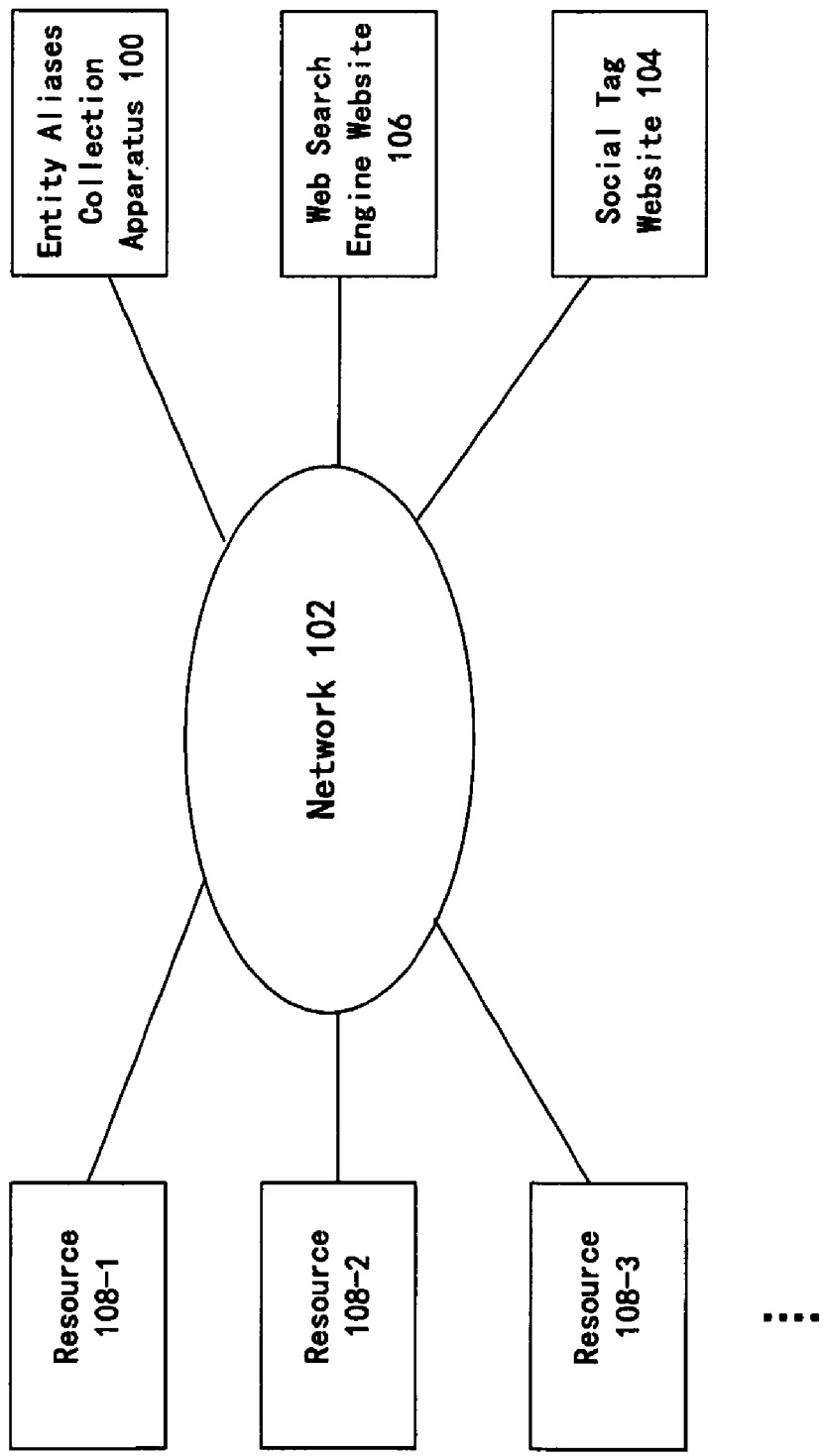
FIG. 1 illustrates an exemplary network environment in which the method for collecting entity aliases according to one embodiment of the present invention is implemented.

Below, embodiments of the invention will be described in detail in conjunction with the appended figures. The figures form a part of the specification and illustrate some embodiments of the invention. It is understood that other embodiments may be used and changes in structures and operations may be made without departing from the scope of the invention. Further, the above embodiments are used to describe how the invention is implemented only, and should not be considered as limitation to the protection scope of the invention. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality FIG. 1 illustrates an example of a network environment in which a method for collecting entity aliases according to one embodiment of the present invention is implemented. As shown in FIG. 1, websites, file systems and various other content-providing apparatuses denoted as resources 108-1, 108-2, 108-3, . . . are coupled to a network 102. Social tag website 104, e.g., http://del.icio.us/, http://blogmark.blogchina.com/, http://www.365key.com, can collect and store tags which are added to resources 108-1, 108-2, 108-3, . . . by the public. Social tag website 104 indexes the Web objects by using these social tags, and thus realizes social classification of the network resources. Web search engine website 106, e.g., http://www.google.com, http://www.baidu.com, http://www.yahoo.com, can retrieve records matching the user's query term from a database, which is established by collecting information from resources 108-1, 108-2, 108-3, and return the results to the user in a certain order. The entity aliases collecting apparatus 100 according to the present invention may access to the Web search engine website 106 and social tag website 104 via the network 102, and thus collect the entity aliases by means of the social tags associated with the Web objects, which will be described in more detail hereinafter.

Figure 2:
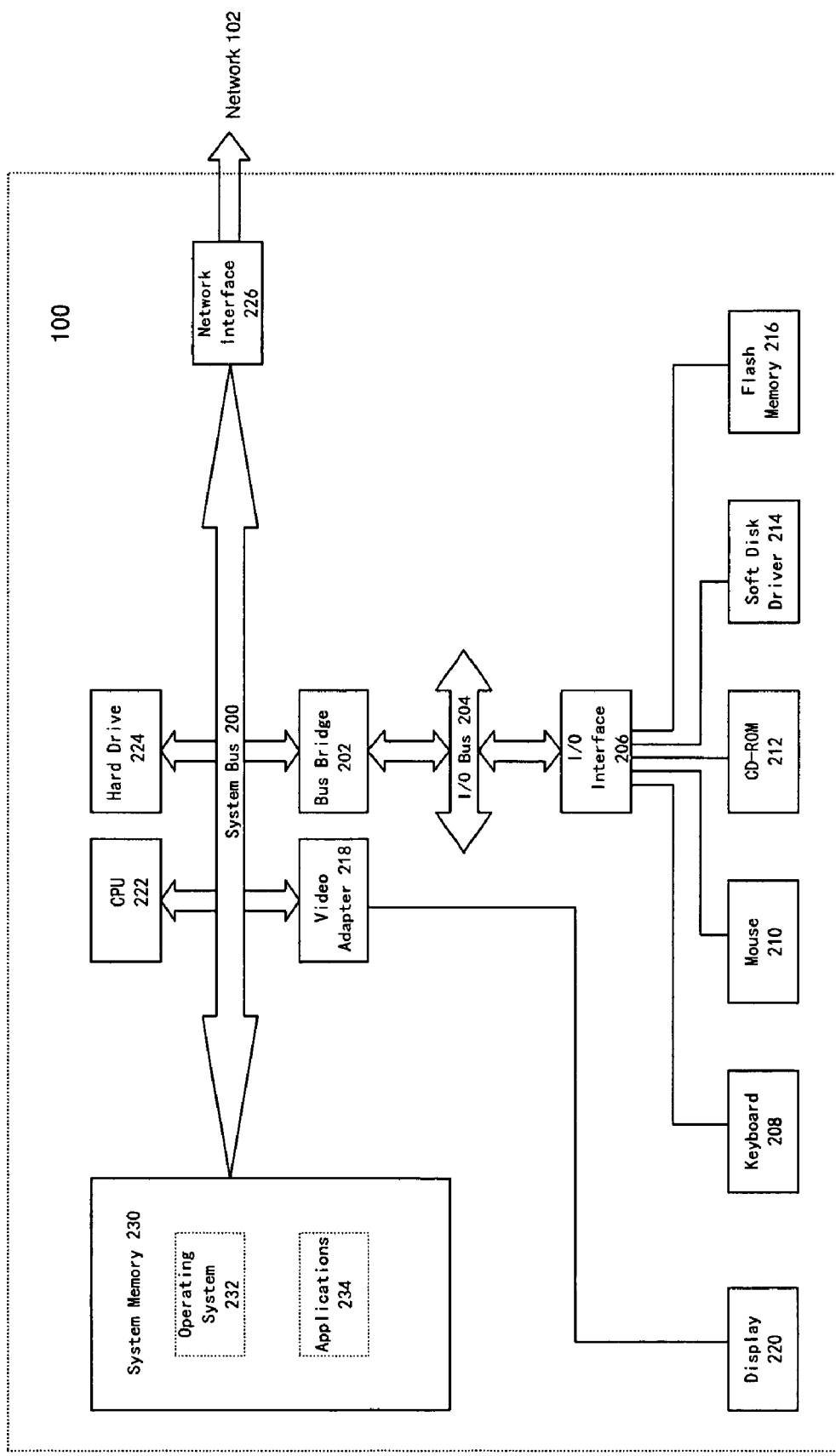
FIG. 2 illustrates an exemplary computer hardware block diagram of an apparatus for collecting entity aliases, as shown in FIG. 1 according to one embodiment of the present invention.

FIG. 2 illustrates an exemplary hardware structure of the apparatus 100, illustrated in FIG. 1, for collecting entity aliases according to one embodiment of the present invention. The apparatus can be realized by general purpose computers. As shown in FIG. 2, apparatus 100 includes a central processing unit (CPU) 222, which is coupled to the system bus 200. Hard drive 224 and video adapter 218 for driving display 220 are also coupled to system bus 200. System bus 200 is coupled to input/output (I/O) bus 204 via bus bridge 202. I/O interface 206 coupled to I/O bus 204 provides communication with various I/O devices including keyboard 208, mouse 210, read only memory (CD-ROM) drive 212, soft disk drive 214 and flash memory 216. Apparatus 100 may communicate with network 102 via network interface 226 coupled to system 200. System memory 230 is also coupled to system 200, which stores therein operating system 232 and applications 234. Applications 234 include: a browser application which can receive/send message from/to network 102 by means of hyper text transmission protocol (HTTP), an application which contains software codes for implementing the steps of the entity aliases collecting method of the present invention, and other applications.

Figure 3:
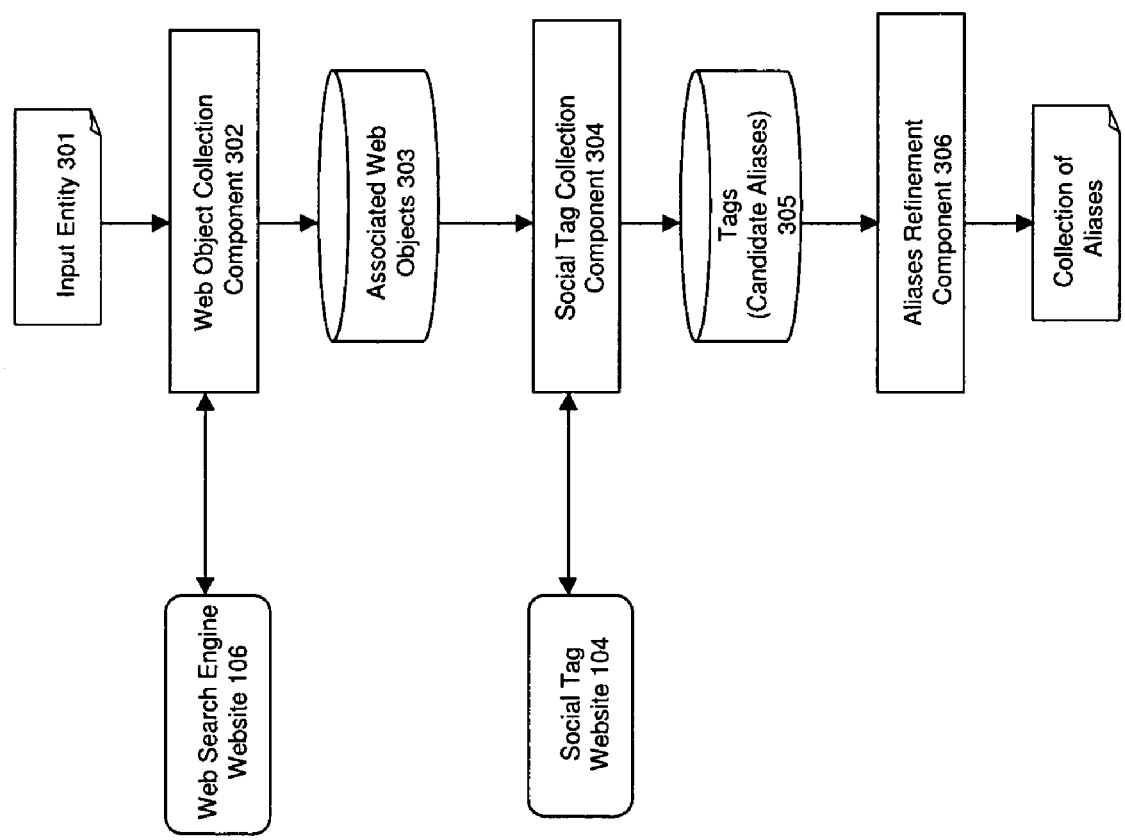
FIG. 3 illustrates a software component architecture for implementing a method for collecting entity aliases according to one embodiment of the present invention.

FIG. 3 illustrates a software component architecture for implementing a method for collecting entity aliases according to one embodiment of the present invention. The illustrated architecture includes three basic components: Web object collection component 302, social tag collection component 304 and alias refinement component 306.

Web object collection component 302 receives the entity input by the user 301, and searches for the input entity 301 on the network through Web search engine website 106 like Google, Baidu and Yahoo!, so as to obtain a list of Web objects 303 associated with the entity 301 returned from the Web search engine website 106. Web object collection component 302 provides the returned Web objects 303 to social tag collection component 304.

Social tag collection component 304 searches for the returned Web objects 303 on social tag website 104, so as to retrieve the social tags 305 for the Web objects 303. The received social tags 305 are considered as candidate aliases of the user's input entity 301. Then, social tag collection component 304 provides these social tags (i.e., candidate aliases) 305 to the alias refinement component 306 for refinement processing.

Alias refinement component 306 applies named entity recognition (NER) technology to each tag 305 provided by the social tag collection component 304, so as to recognize and label the entities therein. Then, the entities are ranked according to one or more of the following criteria: the homogeneity between the entity as recognized and the user's input entity 301 (i.e., whether the recognized entity and the user's input entity 301 are of the same kind, and if not, the degree of similarity between them), the occurrence frequency of the tags which contain the recognized entity, and the authoritativeness of the Web objects from which the entity is obtained, etc. Finally, those entities which have a rank higher than a predetermined threshold are determined as a collection of aliases of the user's input entity 301.

Figure 4:
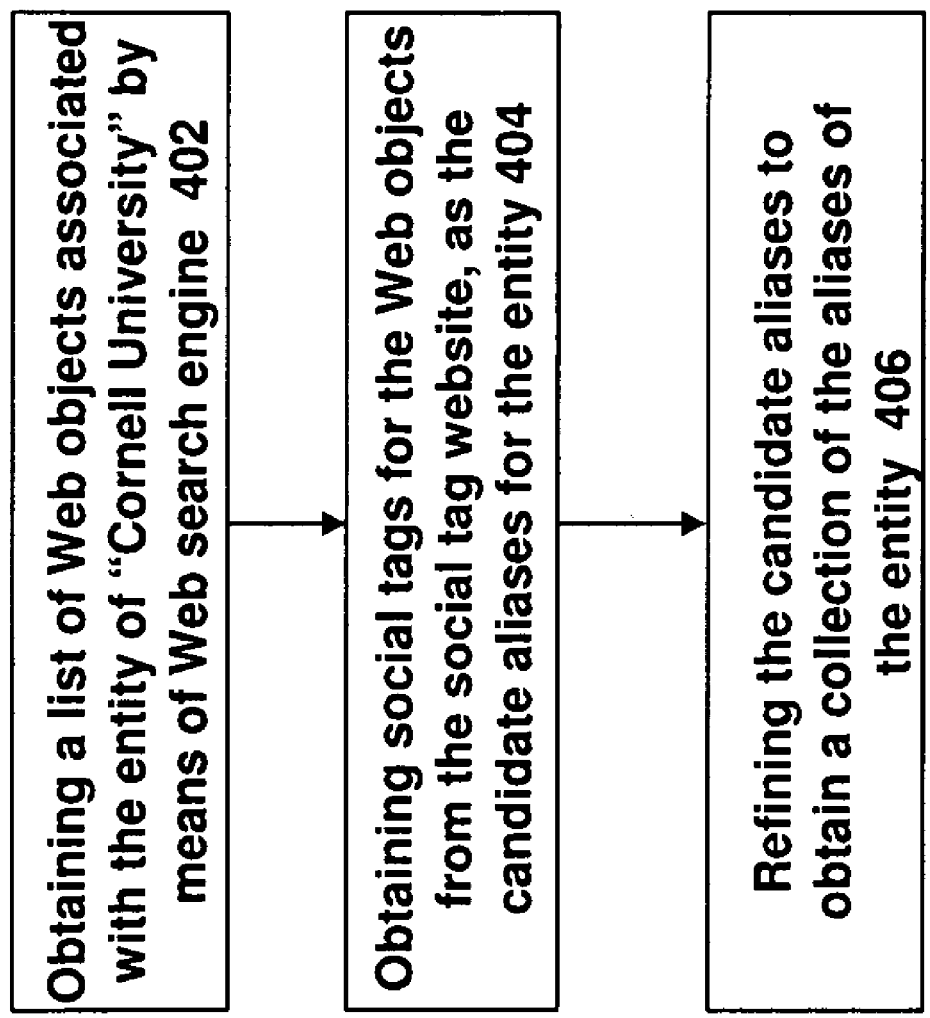
FIG. 4 illustrates a processing flow chart of a method for collecting entity aliases according to one embodiment of the present invention.

Next, the method for collecting entity aliases according to the present invention will be explained with reference to the processing flowchart in FIG. 4, which illustrates a processing flow of a method for collecting entity aliases according to one embodiment of the present invention. In this example, it is assumed that the user wants to collect the aliases of the organizational entity "Cornell University".

In step 402, Web object collection component 302, upon receiving the entity name "Cornell University" input by the user, searches for the input entity "Cornell University" on Web search engine websites 106 such as Google, Baidu, and Yahoo!, so as to obtain a list of Web objects associated with the entity.

Web object collection component 302 can search for Web objects associated with an entity on Web search engine website 106 in the following two ways.

The first way is to search by means of programming interface of the Web search engine. Generally, major Web search engine service providers like Google and Yahoo! have provided convenient application programming interfaces. In this case, Web object collection component 302 directly sends the content to be searched to Web search engine website 106 via the programming interface, and the website 106 returns the search results in a structuralized form. Table 1 shows an example using the application programming interface of Google (Google API). The search function using the Google API is able to be realized through the following Java pseudo codes based on the specific client key obtained in advance from Google company and the Google API development toolkit downloaded in advance:

TABLE 1

| | |
|---|---|
| GoogleSearch s = new GoogleSearch( ); | // create a Google search service instance; |
| s.setKey(clientKey); | // set client key in the service instance |
| s.setQueryString(name of the entity to be searched); | // set query string |
| GoogleSearchResult result = s.doSearch( ); | // start Goolgle to conduct search, and the search results are obtained from GoogleSearchResult |
| GoogleSearchResultElement[ ] re = run.getResultElements( ); | // obtain search results data array, each item in the data array being called a "Search Result Element" |
| for each GoogleSearchResultElement e in the array re, { | //read the items in the search results from the data array of the Result Elements |
|   e.getURL( ); | //get the URL of the search results |
|   e.getTitle( ); | // get the title of the search results |
| } | |

The second way is to use Internet connection to get the returned page from the Web search engine, and then analyze the format of the returned page to obtain the search results. This method comprises three major steps: firstly, the internet connection is established; secondly, the query string is converted into a unified resource locator (URL) which is sent to the internet connection to get the result page; and thirdly, the format of the resulting page is analyzed to extract the URL and title of the desired search result. These three steps can be realized, e.g., by the following Java pseudo codes shown in TABLE 2.

TABLE 2

| | |
|---|---|
| HINTERNET hINET = InternetOpen( ); | // create Internet connection handle; |
| String u = Encode( a Query q ); | // convert the query strings into a URL |
| HINTERNET hURL = InternetOpenUrl(hINET, u); | // open the URL, i.e., send a request to INTERNET to obtain the contents for this URL |
| String page = InternetReadFile(hURL); | // read the contents of the page |
| Extract the URL, titles from the content of page | // analyze the contents of the page, to extract the URL and the title of each desired search result item |

Take the search engine website of Baidu for instance, in the case where the query string itself consists entirely of English characters, the query string itself plus a prefix "http://www.baidu.com/s?wd=" may be directly used. If the query string contains a space, then the space is converted into a plus sign "+". Specifically, for "Cornell University" in this example, a request for "http://www.baidu.com/s?wd=Cornell+University" may be submitted to the Internet. The page returned from Web search engine website 106 is in the form of HTML marks and text. By finding some specific feature strings, the URL and title of each result items can be extracted.

For the case of "Cornell University", Web object collection component 302 can obtain the following results, shown in TABLE 3, from the Web search engine website 106 (e.g., Baidu):

TABLE 3

| Title of the Web objects | URL of the Web Objects |
|---|---|
| Welcome to Cornell University | www.cornell.edu/ |
| USNews.com: America's Best Colleges 2008: Cornell University: At a glance | colleges.usnews.rankingsandreviews.com/ usnews/edu/college/directory/brief/ drglance__2711__brief.php |
| USNews.com: America's Best Graduate Schools 2008: Cornell | grad-schools.usnews.rankingsandreviews.com/ usnews/edu/grad/directory/dir-eng/brief/ glanc__02118__brief.php |
| Mann Library at Cornell University | www.mannlib.cornell.edu/ |
| Cornell University Library Gateway | www.library.cornell.edu/ |
| College of Veterinary Medicine: Cornell University | www.vet.cornell.edu/ |
| Department of Computer Science, Cornell University | www.cs.cornell.edu/ |
| . . . | |

In step 404, social tag collection component 304 searches on the social tag website 104 for the Web objects returned in step 402, so as to retrieve all the social tags for these Web objects.

Similar to the case of Web object collection component 302, if the social tag service provider has provided the application programming interface, the social tag collection component 304 can directly send the content to be searched to social tag website 104 via the application programming interface, and the website 104 returns the search results.

On the other hand, if the social tag service provider does not provide the application programming interface, a method of obtaining a page and analyzing the page similar to that described above can be utilized. Take the tag service provided by del.icio.us for instance, in order to obtain the social tags for a URL, the following Internet request can be sent: http://del.icio.us/url/check?url=http %3A%2F%2Fwww.website.com/dir/page.htm, wherein the "%3A%2F%2F" is the hexadecimal representation of "://". For example, if it is desirable to know which tags have been added to http://www.cornell.edu by the public, a request for http://del.icio.us/url/check?url=http %3A %2F %2Fwww.cornell.edu may be sent to the Internet. By finding some specific feature strings in the returned pages, all the social tags associated with the URL can be extracted.

According to an embodiment, social tag collection component 304 also classifies the Web objects according to the URL format thereof. Specifically, the URLs of the Web objects are resolved as URL=protocol+host name+directory name+file name. URL formats only containing HTTP host names are homepages. URL formats with directory names are entry pages. Other URL formats are article pages. The analysis of the URL of Web objects provides a clue about the authoritativeness of the Web objects, which can be used for the alias refinement step.

For the example of "Cornell University", the results of the social tag collection component 304 searching on the social tag website 104 (e.g., del.icio.us) for the tags of the Web objects and classifying the Web objects are illustrated in TABLE 4, as follows:

TABLE 4

| Title of the Web objects | URLs of the Web objects | URL type | Social tags |
|---|---|---|---|
| Welcome to Cornell University; | www.cornell.edu/ | Homepage | Cornell Cornell_University academia gradschool new_york |
| USNews.com: America's Best Colleges 2008: Cornell University: At a glance | colleges.usnews.rankingsandreviews.com/ usnews/edu/college/directory/brief/ drglance_2711_brief.php | Article page | N/A |
| USNews.com: America's Best Graduate Schools 2008: Cornell | grad-schools.usnews.rankingsandreviews.com/ usnews/edu/grad/directory/dir-eng/brief/ glanc_02118_brief.php | Article page | N/A |
| Mann Library at Cornell University | www.mannlib.cornell.edu/ | Homepage | Cornell Mann_Library Cornell_U |
| Cornell University Library Gateway | www.library.cornell.edu/ | Homepage | Cornell_Univ Library |
| College of Veterinary Medicine: Cornell University | www.vet.cornell.edu/ | Homepage | Big_Red Cornell Conell_University College |
| Department of Computer Science, Cornell University | www.cs.cornell.edu/ | Homepage | Computer_Science |
| . . . | | | |

All the tags in the column of "social tags" are considered as the candidate aliases for the entity of "Cornell University", and these candidate aliases are provided to the alias refinement component 306.

In step 406, alias refinement component 306 performs refinement processing on the candidate aliases. According to one embodiment, the refinement step 406 is realized by the following sub-steps 406a-406d.

In step 406a, all the social tags obtained in step 404 (i.e., candidate aliases) are assembled into a list of tuples consisting of <tag>, <frequency> and <list of URL and URL type>, wherein each element in <list of URL and URL type> are made up of <URL value> and <URL type>. For the example of "Cornell University", the assembled list is illustrated in TABLE 5:

TABLE 5

| | | List of <URL> and <URL-type> | |
|---|---|---|---|
| Social tags | Frequency | <URL value> | <URL type> |
| Cornell | 3 | www.cornell.edu/ www.mannlib.cornell.edu/ www.vet.cornell.edu/ | homepage homepage homepage |
| Cornell_University | 2 | www.cornell.edu/ www.vet.cornell.edu/ | homepage homepage |
| Mann_Library | 1 | www.mannlib.cornell.edu/ | homepage |
| Cornell_Univ | 1 | www.library.cornell.edu/ | homepage |
| Big_Red | 1 | www.vet.cornell.edu/ | homepage |
| Computer_Science | 1 | www.cs.cornell.edu/ | homepage |
| Cornell_U | 1 | www.mannlib.cornell.edu/ | homepage |
| N/A | 2 | colleges.usnews.rankingsandreviews.com/ usnews/edu/college/directory/brief/ drglance_2711_brief.php | article_page |
| | | grad-schools.usnews.rankingsandreviews.com/ usnews/edu/grad/directory/dir-eng/brief/ glanc_02118_brief.php | article_page |
| academia | 1 | www.cornell.edu/ | homepage |
| gradschool | 1 | www.cornell.edu/ | homepage |

TABLE 5-continued

| | | List of <URL> and <URL-type> | |
|---|---|---|---|
| Social tags | Frequency | <URL value> | <URL type> |
| new_york | 1 | www.cornell.edu/ | homepage |
| Library | 1 | www.library.cornell.edu/ | homepage |
| College | 1 | www.vet.cornell.edu/ | homepage |

In step 406b, the named entity recognition (NER) engine is applied to these tags to detect and label the entities. NER is a program for recognizing entities from a given piece of text. It outputs the starting position, end position and type of the recognized entities.

Figure 5:
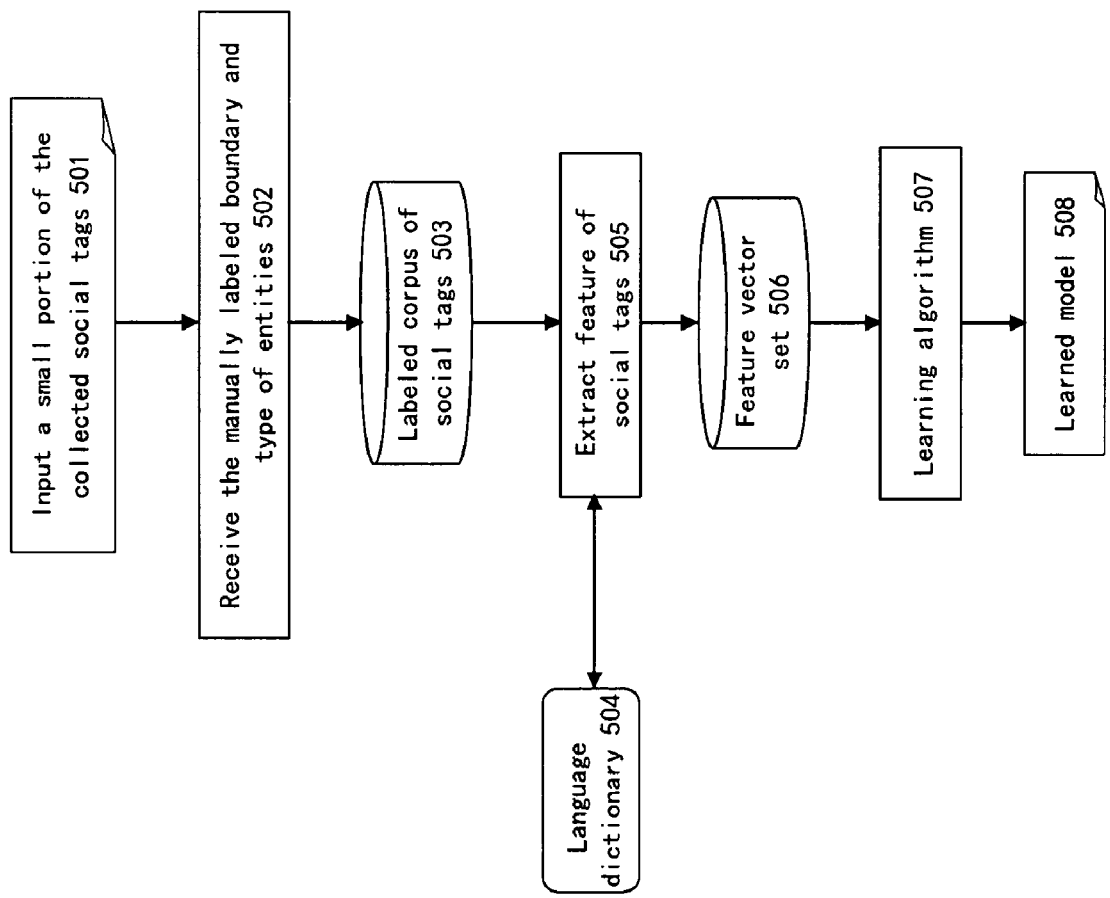
FIG. 5 illustrates a processing flow diagram of the operations performed by a training module in the named entity recognition (NER) engine according to one embodiment of the present invention.

The NER engine can be realized by the known art. Specifically, the NER engine involved in the present invention can be implemented by a machine learning method. The machine learning method is made up of two major modules: training module and applying module. FIG. 5 illustrates a processing flow diagram for the operations performed by the training module according to one embodiment of the present invention. A small portion of collected social tags 501 are manually labeled, then the manually-labeled boundaries and types of these entities are received 502, and a labeled social-tag corpus is obtained 503. Feature extraction of social tags is performed on the labeled corpus 503 by means of language dictionary 504. The feature extraction step 505 results in a feature vector set 506, which includes various linguistic features, e.g., a word itself, its preceding and following words, whether the beginning letter is capitalized, the prefix of a word, the postfix of a word, the semantic type of a word, etc. Feature vector set 506 is sent to learning algorithm 507, and a learned model is obtained 508. The learned model 508 describes the contribution probability of all the features in the feature vector to each named entity type.

Figure 6:
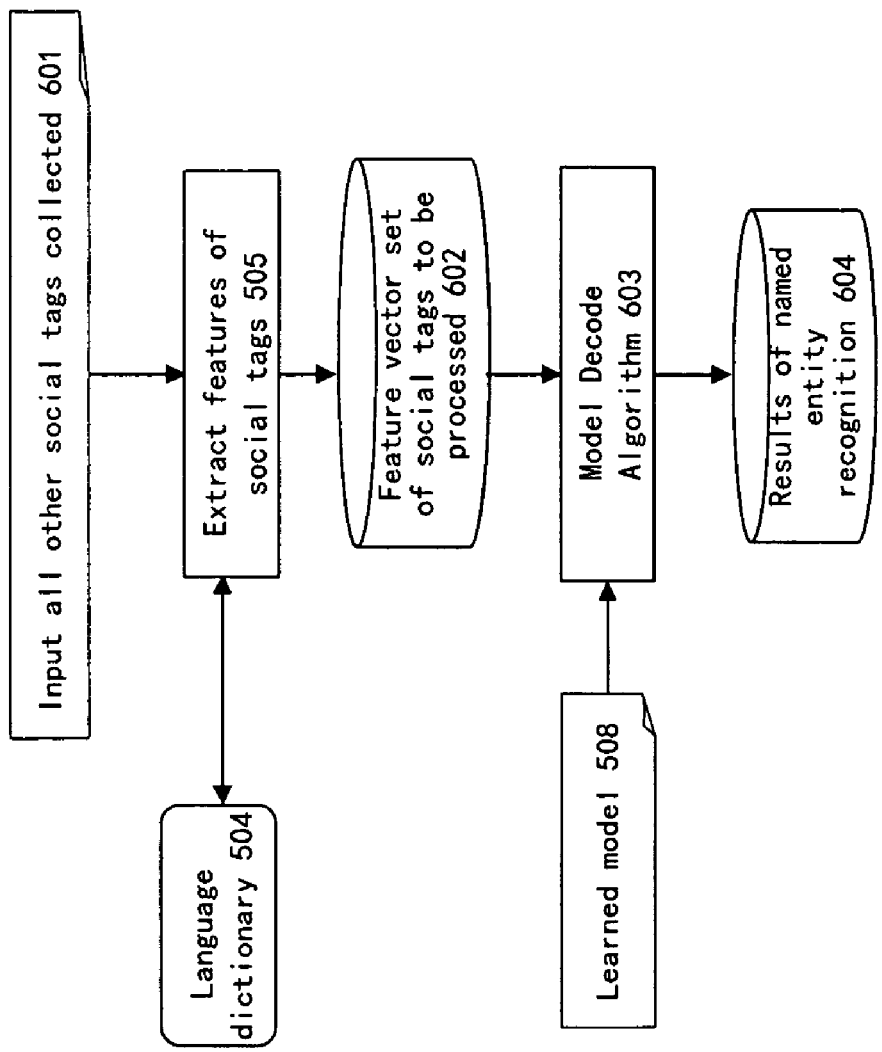
FIG. 6 illustrates a processing flow diagram of the operations performed by the applying module in the named entity recognition (NER) engine according to one embodiment of the present invention.

FIG. 6 shows a processing flow diagram of the operations performed by the applying module according to one embodiment of the present invention. The same language dictionary 504 as used in the training module is applied to the remaining larger portion of social tags 601 as collected, a same step 505 of extracting the feature of social tags is performed, and a feature vector set 602 of the social tags to be processed is obtained. Then, the model 508 learned in the training module is applied to the model decoding algorithm 603, and the results of named entity recognition 604 are obtained.

For the example of "Cornell University", the recognition result of the named entity recognition engine for the collected social tags are illustrated in TABLE 6:

TABLE 6

| Social tags | Results of named entity recognition |
|---|---|
| Cornell | "Cornell": family name, proper noun |
| Cornell_University | "Cornell": family name, proper noun |
| | "Cornell_University": name of university |
| Mann_Library | "Mann": family name, proper noun |
| | "Mann_Library": name of building |
| Cornell_Univ | "Cornell": family name, proper noun |
| | "Cornell_Univ": abbreviation of university name |
| Big_Red | "Big_Red": nickname |
| Computer_Science | "Computer_Science": name of discipline |
| Cornell_U | "Cornell": family name, proper noun |
| | "Cornell_U": abbreviation of university name |
| academia | No named entity |
| gradschool | No named entity |

TABLE 6-continued

| Social tags | Results of named entity recognition |
|---|---|
| new_york | "new_york": name of place |
| Library | "Library": general name of buildings |
| College | "College": general name of universities |

Step 406b filters away those tags containing no entity.

In step 406c, the entities recognized in step 406b are ranked according to one or more of the following criteria or the combination thereof: the homogeneity with the entity input by the user, the occurrence frequency of the tags which contain the entity, and the authoritativeness of the Web objects from which the entity is obtained, etc. For example, types like "university name" and "abbreviation of university name" can be regarded as having a higher homogeneity with the user's input entity, while types like "general name of buildings" and "name of place" are regarded as having a lower homogeneity with the user's input entity. Regarding the authoritativeness of the Web objects, as mentioned in step 404 previously, it can be determined from URL type of the Web objects. For example, Web objects of "homepage" type can be regarded as having the highest authoritativeness, Web objects of "entry page" type can be regarded as having a lower authoritativeness, and Web objects of "article page" type can be regarded as having the lowest authoritativeness.

In step 406d, those entities with a rank higher than a predetermined threshold in step 406c are collected as the aliases of the user's input entity.

For the example of "Cornell University", the collection of aliases finally determined by the aliases refinement component 306 based on a predetermined combination of the above criteria is as follows:

Cornell
Cornell U
Cornell University
Big Red

In similar ways to the above example, it is possible to automatically and quickly collect the aliases of almost all the real world entities by obtaining a large number of Web objects and their social tags.

The present invention has been described above with reference to one embodiment. It should be noted that, the description of one embodiment is only for illustration purpose and shall not be understood as limiting the present invention. For example, in the embodiment described above, entity aliases collection apparatus 100 accesses to search engine website 106 like Google and Baidu via network 102 to obtain a list of Web objects associated with the input entities. However, those skilled in the art can appreciate that the present invention is not limited to this. Entity aliases collection apparatus 100 itself can run a search engine or can be coupled to a local search engine apparatus to obtain a list of Web objects associated with the input entities. As another example, in the embodiment described above, social tag collection component 304 collects social tags for all the Web objects returned by the web object collection component 302. However, the present invention is not limited to this. Instead, according to predetermined rules, social tags can be collected only for some of the Web objects (e.g., Web objects of specific types, or a certain number of Web objects from the beginning of the returned list).

Moreover, the present invention may be embodied as computer program product, and can be accessed from computer readable medium. The computer readable medium provides program code for use in conjunction with computers or any other instruction executing systems. The computer readable medium may be electronic, magnetic, optical, electromagnetic, infra and semiconductor devices. The specific examples of computer readable medium include semiconductor or solid memory, magnetic tape, removable disk, random access memory (RAM), read only memory (ROM), hard disk and optical disk. The current examples of optical disk include CD-ROM, CD-R/W, and DVD, etc.

Although a specific embodiment of the invention has been disclosed, it will be understood by those having skill in the art that various modifications and changes can be made without departing the spirit and scope of the present invention. The scope of the invention is not to be restricted, therefore, to the specific embodiment, and it is intended that the appended claims cover any and all such applications, modifications, and embodiments within the scope of the present invention.

What is claimed is:

1. A method for collecting entity aliases, the method comprising:
    obtaining at least one web object in a result produced by a web search engine in response to a web search query based upon an input entity;
    obtaining, from a social tag website in response to obtaining the at least one web object, a respective set of social tags that is associated, on the social tag web site, with the at least one web objects, the respective set of social tags comprising at least one alias for at least one web object within the at least one web objects;
    defining, based upon a relationship on the social tag website between social tags within the respective set of social tags and the web objects, candidate aliases for the input entity, the candidate aliases comprising values of social tags within the respective set of social tags;
    extracting features from the candidate aliases, the extracting being based upon at least one of:
        a word within a candidate alias within the candidate aliases;
        at least one of a word preceding and following the candidate alias within the candidate aliases;
        capitalization of a beginning letter of a word within the candidate aliases;
        a prefix of a word within the candidate alias within the candidate aliases;
        a postfix of a word within a candidate alias within the candidate aliases; and
        a semantic type of a word within a candidate alias within the candidate aliases;
    detecting, using a processor, a set of detected entities within the candidate aliases by applying a named entity recognition engine to the candidate aliases, the each detected entity within the set of detected entities comprising a respective feature vector set representing features extracted from the candidate aliases, the applying the named entity recognition engine comprising:
        creating a learned model based upon feature vector sets from a first plurality of detected entities; and
        applying the learned model to a second plurality of detected entities, the second plurality of detected entities being different than the first plurality;
    ranking each of the detected entities according to a respective quality criteria comprising any one of or a combination of any of:
        the homogeneity of the detected entity with the input entity;
        the occurrence frequency of the tags which contain the detected entity; and
        the authoritativeness of the web objects from which the entity is obtained;
    collecting detected entities having a rank higher than a predetermined threshold to obtain a collection of aliases of the input entities; and
    storing the collection of aliases of the input entities into a dataset.

2. An apparatus for collecting entity aliases, comprising:
    a web object collection component adapted to obtain web objects in a result produced by a web search engine in response to a web search query based upon an input entity;
    a social tag collection component adapted to:
        obtain, from a social tag website in response to the web object collection component obtaining the web objects, a respective set of social tags that are associated, on the social tag web site, with the web objects; and
        define, based upon a relationship on the social tag website between social tags within the respective set of social tags and the web objects, candidate aliases for the input entity, the candidate aliases comprising values of social tags within the respective set of social tags; and
    an aliases refinement processor adapted to refine the candidate aliases using a process comprising:
        extracting features from the candidate aliases, the extracting being based upon at least one of:
            a word within a candidate alias within the candidate aliases;
            at least one of a word preceding and following the candidate alias within the candidate aliases;
            capitalization of a beginning letter of a word within the candidate aliases;
            a prefix of a word within the candidate alias within the candidate aliases;
            a postfix of a word within a candidate alias within the candidate aliases; and
            a semantic type of a word within a candidate alias within the candidate aliases;
        detecting a set of detected entities within the candidate aliases by applying a named entity recognition engine to the candidate aliases, the each detected entity within the set of detected entities comprising a respective feature vector set representing features extracted from the candidate aliases, the applying the named entity recognition engine comprising:
            creating a learned model based upon feature vector sets from a first plurality of detected entities; and
            applying the learned model to a second plurality of detected entities, the second plurality of detected entities being different than the first plurality;
        ranking each of the detected entities according to a respective quality criteria comprising any one of or a combination of any of:
            the homogeneity of the detected entity with the input entity;

the occurrence frequency of the tags which contain the detected entity; and the authoritativeness of the web objects from which the entity is obtained;

collecting detected entities having a rank higher than a predetermined threshold to obtain a collection of aliases of the input entities; and storing the collection of aliases of the input entities into a dataset.

3. A computer program product comprising a machine readable medium, the machine readable medium being tangibly encoded with machine executable instructions to perform a method for collecting entity aliases, the method comprising the steps of:

obtaining at least one web object in a result produced by a web search engine in response to a web search query based upon an input entity;

obtaining, from a social tag website in response to obtaining the at least one web object, a respective set of social tags that is associated, on the social tag web site, with the at least one web objects, the respective set of social tags comprising at least one alias for at least one web object within the at least one web objects;

defining, based upon a relationship on the social tag website between social tags within the respective set of social tags and the web objects, candidate aliases for the input entity, the candidate aliases comprising values of social tags within the respective set of social tags;

extracting features from the candidate aliases, the extracting being based upon at least one of:

a word within a candidate alias within the candidate aliases;

at least one of a word preceding and following the candidate alias within the candidate aliases;

capitalization of a beginning letter of a word within the candidate aliases;

a prefix of a word within the candidate alias within the candidate aliases;

a postfix of a word within a candidate alias within the candidate aliases; and a semantic type of a word within a candidate alias within the candidate aliases;

detecting, using a processor, a set of detected entities within the candidate aliases by applying a named entity recognition engine to the candidate aliases, the each detected entity within the set of detected entities comprising a respective feature vector set representing features extracted from the candidate aliases, the applying the named entity recognition engine comprising:

creating a learned model based upon feature vector sets from a first plurality of detected entities; and applying the learned model to a second plurality of detected entities, the second plurality of detected entities being different than the first plurality;

ranking each of the detected entities according to a respective quality criteria comprising any one of or a combination of any of:

the homogeneity of the detected entity with the input entity;

the occurrence frequency of the tags which contain the detected entity; and the authoritativeness of the web objects from which the entity is obtained;

collecting detected entities having a rank higher than a predetermined threshold to obtain a collection of aliases of the input entities; and storing the collection of aliases of the input entities into a dataset.

* * * * *